United States Patent [19]

Kodera et al.

[11] 4,404,541
[45] Sep. 13, 1983

[54] REAR OBSTACLE DETECTING SYSTEM FOR AUTOMOTIVE VEHICLES

[75] Inventors: Masao Kodera; Sigeyuki Akita; Yasuhisa Yoshino, all of Okazaki, Japan

[73] Assignee: Nippon Soken, Inc., Nishio, Japan

[21] Appl. No.: 279,014

[22] Filed: Jun. 30, 1981

[30] Foreign Application Priority Data

Jul. 3, 1980 [JP] Japan .............................. 55-94336[U]

[51] Int. Cl.³ .............................................. G08G 1/00
[52] U.S. Cl. ........................................ 340/32; 340/34; 340/70; 367/909
[58] Field of Search ....................... 340/32, 33, 34, 70; 343/7 VM, 182; 367/135, 137, 909

[56] References Cited

U.S. PATENT DOCUMENTS 4,015,232 3/1977 Sindle ..................................... 340/32
4,278,962 7/1981 Lin ......................................... 340/32

*Primary Examiner*—James J. Groody
*Attorney, Agent, or Firm*—Cushman, Darby & Cushman

[57] ABSTRACT

A rear obstacle detecting system for automotive vehicles includes an ultrasonic transmitter/receiver unit, distance detecting unit and an indicator for measuring distance to an obstacle while a vehicle is in backward movement. The ultrasonic transmitter/receiver unit having a ultrasonic vibrator is always energized as long as the vehicle is in an operating condition irrespective of whether the vehicle is in a backward movement or not, in order to maintain the ultrasonic vibrator being vibrated to achieve a self-cleaning function. The indicator is energized only when the vehicle is in backward movement.

7 Claims, 2 Drawing Figures

REAR OBSTACLE DETECTING SYSTEM FOR AUTOMOTIVE VEHICLES

BACKGROUND OF THE INVENTION

The present invention relates to a system designed so that the distance from an automotive vehicle to an obstacle in the rear of the vehicle is detected and indicated by means of ultrasonic waves, thus aiding the driving of the vehicle during its backward movement.

In the past, both systems employing ultrasonic waves and systems employing optical instruments for the purpose of detecting an obstacle in the rear of a vehicle have been proposed. These systems have been necessarily mounted on the exterior trimming of the vehicle compartment and consequently the systems have been placed in surroundings where they are subject to temperature and humidity as well the deposition of dirt or dust. In particular, the deposition of dirt or dust has considerably deteriorated the functions of these systems. Thus, these systems have been subject to the trouble of requiring frequent and positive checks despite the systems being mounted on the exterior trimming at the rear part of the vehicle compartment where it is very difficult to look at. The addition of a self-checking device for overcoming this difficulty results in a considerable increase in the cost.

SUMMARY OF THE INVENTION

With a view to overcoming the foregoing deficiencies in the prior art, it is the object of the present invention to provide an improved detecting system so designed that the self-cleaning function of the system itself is utilized so as to clean the detecting system with a simple construction and thereby to ensure accurate operation and improved durability to the system.

More specifically, noting the fact that in contrast to optical detecting systems, a detecting system of the type employing an ultrasonic transmitter/receiver unit itself has a self-cleaning function due to the excitation action of its ultrasonic vibrator, the present invention proposes a specific construction for positively utilizing this fact. In other words, while the known rear obstacle detecting systems have been generally constructed so as to operate only during the backward movement of vehicles, in accordance with the system of this invention its power supply circuit is so constructed that during the normal operation of a vehicle at least the ultrasonic vibrator is excited so that the self-cleaning function is performed frequently during the operation of the vehicle. Furthermore, it is constructed so that its indicator is energized when the vehicle is moved backward, thus allowing the system to serve its rear obstacle detecting function.

Whether the vehicle is in the normal operation can be directly detected in response to the closing of the accessory contacts or the ignition contacts of the key switch or the closing of the power supply circuit of the vehicle. Furthermore, the same can be detected indirectly in response to the rising of the neutral point voltage of the alternator.

Whether the vehicle is in reverse or in a backward movement can for example be detected in response to the transmission shift lever switch or the gear position switch. Such switch may be inserted directly in the supply circuit of the indicator or the switch may be inserted in the energization circuit of the supply main relay.

DESCRIPTION OF THE PREFERRED EMBODIMENTS

The present invention will now be described in greater detail with reference to the illustrated embodiments.

Figure 1:
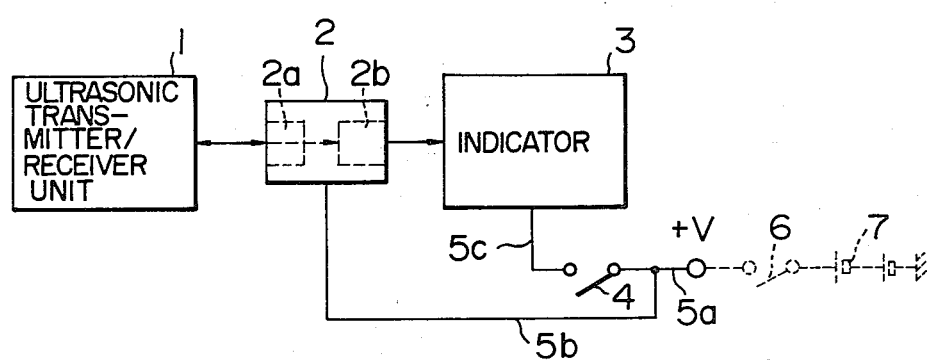
FIG. 1 is a block diagram showing a first embodiment of the present invention.

In accordance with the embodiment shown in FIG. 1, the detecting system comprises a transmitter/receiver unit 1 mounted at the rear exterior portion of an automotive vehicle and including an ultrasonic vibrator for effecting the transmission and reception of ultrasonic waves, an electronic distance detecting unit 2 including an excitation circuit 2a for driving the ultrasonic transmitter/receiver unit 1 and computing means 2b for processing the received signal of the ultrasonic transmitter/receiver unit 1 to detect the distance to an obstacle, an indicator 3 responsive to the output signal of the distance detecting unit 2 to indicate the distance to the obstacle, a switch 4 responsive to the transmission so as to be closed when the gear position is reverse and a power supply circuit including supply lines 5a, 5b and 5c. In the power supply circuit, the supply line 5a is connected to a vehicle battery 7 through a key switch 6, the line 5b is connected between the line 5a and the distance detecting unit 2 and the line 5c is connected to energize the indicator 3 via the line 5a and the gear switch 4. The need to specially provide the switch 4 may be eliminated by using as the line 5c the supply line of the reverse lamp for informing of the reverse movement of the vehicle. Furthermore, the ultrasonic vibrator may be comprised of the EFR-R40KZ manufactured by Matsushita Electric Industry Co., Ltd.

With the construction described above, the switch 4 is opened except when the transmission position is reverse, so that no electric power is supplied to the indicator 3 and the indicator 3 is not energized. On the other hand, irrespective of the transmission position, the distance detecting unit 2 is supplied with power so long as the vehicle is in operation or the key switch 6 is closed, so that an electric signal is always applied to the ultrasonic transmitter/receiver unit 1 and the ultrasonic vibrator is excited, thus preventing the deposition of dirt, dust or the like. When the transmission position is changed to reverse so that the switch 4 is closed, the indicator 3 is operated so that the distance to a rear obstacle is indicated and the operation of the vehicle in reverse is aided.

Figure 2:
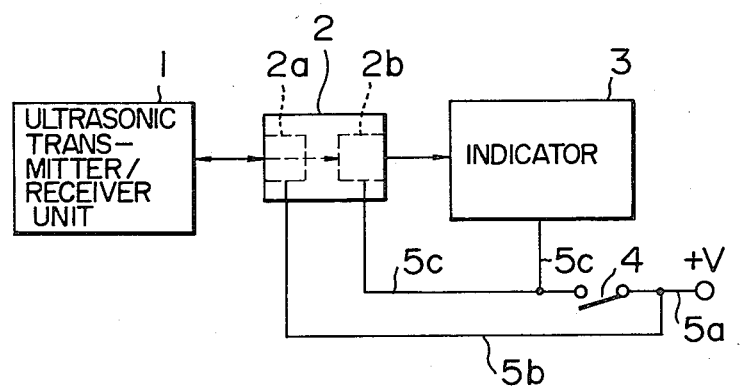
FIG. 2 is a block diagram showing a second embodiment of the present invention.

The second embodiment shown in FIG. 2 differs from the first embodiment in that the supply of power to the computing means 2b in the distance detecting unit 2 is also effected via the switch 4 and thus the computing means 2b and the indicator 3 are operated simultaneously.

It will thus be seen from the foregoing that in accordance with the present invention, by virtue of its construction whereby the ultrasonic vibrator is always operated when the vehicle is in operation and the indication function is performed only during the reverse movement of the vehicle, the entire system is activated only in case of need and also the self-cleaning effect owing to the excitation of the ultrasonic vibrator is allowed its full play, thus preventing the deposition of dirt, dust or the like and ensuring positive operation and improved durability of the system.

What is claimed is:

1. A rear obstacle detecting system for an automotive vehicle comprising:
    ultrasonic transmitting and receiving means having an electrically operable ultrasonic vibrator mounted at the rear exterior portion of said automotive vehicle;
    electrically operable computing means in response to a received signal from said ultrasonic transmitting and receiving means for determining a distance to an obstacle in the backward direction of said automotive vehicle;
    electrically operable utilizing means connected to said computing means for utilizing a result of the determination of said computing means;
    first detection means for detecting whether said automotive vehicle is in an operating condition or not;
    first power supply control means for energizing said ultrasonic transmitting and receiving means by an electric power source of said vehicle in response to the detection of said detecting means that said vehicle is in the operating condition, thereby to vibrate said ultrasonic vibrator so as to be maintained clean so long as said vehicle is operating;
    second detection means for detecting a backward movement of said vehicle; and
    second power supply control means for energizing said utilization means by said electric power source in response to the detection of the backward movement of said vehicle, thereby to render said utilization means operable only when said vehicle is moving backwardly.

2. A rear obstacle detecting system according to claim 1, wherein said first power supply control means further energizes said computing means when said first detection means detects that said vehicle is in the operating condition.

3. A rear obstacle detecting system according to claim 1, wherein said second power supply control means further energizes said computing means when said second detection means detects that said vehicle is in the backward movement.

4. A rear obstacle detecting system according to claim 1, wherein said first detecting means detects whether a key switch of said vehicle is turned on or not.

5. A rear obstacle detecting system according to claim 1, wherein said second detecting means detects whether one of a transmission shift lever switch and a gear position switch is turned to a reverse position.

6. A rear obstacle detecting system according to claim 1, wherein said utilization means is an indicator for indicating the distance to the obstacle.

7. A rear obstacle detecting system for an automotive vehicle comprising:
    an ultrasonic transmitter and receiver unit having a single ultrasonic vibrator for transmitting and receiving an ultrasonic wave, said ultrasonic transmitter and receiver unit being mounted at the rear exterior portion of said automotive vehicle;
    a distance detecting unit connected to said ultrasonic transmitter and receiver unit and including an excitation circuit for exciting said ultrasonic vibrator and computing means for detecting a distance to an obstacle from the received ultrasonic wave;
    an indicator connected to said computing means of said distance detecting unit for indicating said distance detected;
    a first power supply line for interconnecting said distance detecting unit to an electric power source of said automotive vehicle via a key switch, thereby to energize said ultrasonic vibrator through said excitation circuit to cause vibrations thereof only when said key switch is closed and said automotive vehicle is operating; and
    a second power supply line interconnecting said indicator to said electric power source via a transmission reverse key and said key switch thereby to energize said indicator only when said transmission key and said key switch are closed and said automotive vehicle is in backward movement.

* * * * *